H. G. BUTLER.
EXCAVATOR SHOVEL.
APPLICATION FILED DEC. 20, 1909.

987,612.

Patented Mar. 21, 1911.

WITNESSES:
A. B. Cornelius
Evangeline O. Gibbons

INVENTOR:
Henry G. Butler
BY Eugene Ayres,
ATTORNEY.

UNITED STATES PATENT OFFICE.

HENRY G. BUTLER, OF KENOSHA, WISCONSIN.

EXCAVATOR-SHOVEL.

987,612.  Specification of Letters Patent.  Patented Mar. 21, 1911.

Application filed December 20, 1909. Serial No. 534,068.

*To all whom it may concern:*

Be it known that I, HENRY G. BUTLER, a citizen of the United States, residing at Kenosha, in the county of Kenosha and State of Wisconsin, have invented certain new and useful Improvements in Excavator-Shovels, of which the following is a specification.

The object of my invention is to provide a combined excavating and dumping shovel which being provided with a supporting cable and a cable adapted to draw the shovel toward the filling power is suited to dig and deliver earth or other material and dump it automatically at the desired point when the tension of the filling cable is released. This device is especially adapted for use with derricks, cranes, excavators and the like.

I accomplish my object by the mechanism illustrated in the accompanying drawings, in which,—

Figure 1:
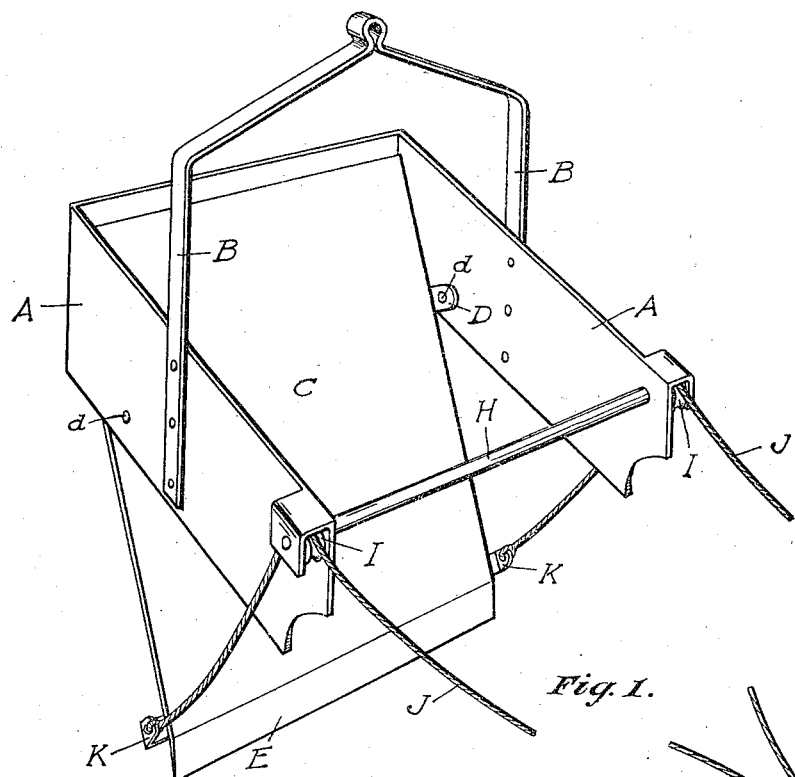
Figure 2:
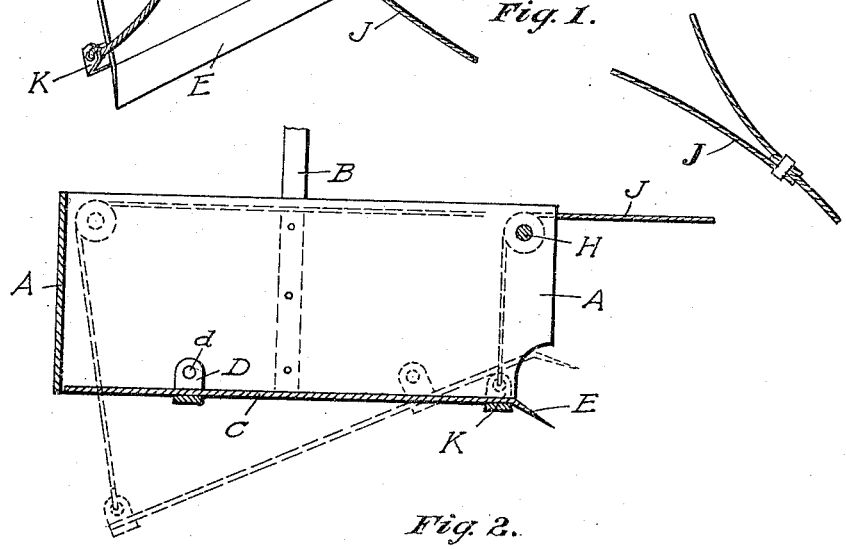

Figure 1 is a perspective of the device the bottom dropped in unloaded position by release of the tension on a flexible cable or chain and on a filling cable, and Fig. 2 is a sectional side view of the device the bottom held closed in drag and loaded position by the tension of the chain and filling cable and arranged for forward dumping, the dotted lines on said figure representing the same shovel arranged for rear dumping.

Similar letters refer to similar parts in the several views.

In the drawings A represents the body member of the device and B the bail thereof.

C is the bottom of the device; it is provided with lugs D D which engage with pivots $d$ $d$ on the sides of the body member, thus pivotally hinging said bottom to the body. As shown these lugs and pivots are set rearward or forward of the center of gravity, leaving the larger part of the load rearward or forward of the hinged part of said bottom thereby causing the device to dump rearward or forward as desired. It is frequently necessary to have the bottom of a shovel of this type automatically adjust itself to the filling or normal position before filling. To accomplish this I make a bottom heaviest on the short end figuring from the hinges, hence like the beam of a scale the bottom assumes a level position when empty and dumps when loaded. E is a shear integral with said bottom adapted to cut down into the earth as the shovel is dragged forward. A brace rod H extends across the front of said device its ends projecting through the sides of the body member forming axles for the support of sheaves I I. The two ends of a chain or cable J are carried over said sheaves down into engagement with eyes in lugs K K which are attached to the bottom of said shovel vertically below said sheaves. Without changing the scope of this invention eyes or guides may be substituted for the sheaves. From the foregoing it will be readily seen that the tension on cable or chain J and the filling cable attached thereto holds said bottom up to the body member during the process of filling and conveying the earth or other material to the dump, and that the mere act of slacking chain J by loosening said filling cable accomplishes the dumping automatically.

What I claim and desire to secure by Letters Patent, is:—

1. In an excavator shovel of the type described a body portion with a bottom hinged thereto and means in connection with a drag line for controlling said bottom, substantially as set forth and shown.

2. An excavator shovel having a body portion and a bottom hinged thereto outside the center of gravity of said bottom and means for controlling said bottom, substantially as shown.

3. An excavator shovel having a body portion and a bottom pivotally hinged to said body outside the center of gravity and drag line mechanism for controlling said bottom, substantially as set forth and shown.

4. An excavator shovel having a body portion, a bottom hinged thereto outside the center of gravity of said bottom, draft line mechanism for controlling said bottom during the filling, carrying and dumping of the bucket and a bail attached to said body portion, substantially as shown.

5. An excavator shovel having a body portion, a bottom hinged thereto outside the center of gravity when loaded and drag line mechanism for controlling said bottom when loaded and empty, substantially as set forth.

6. An excavator shovel having a body portion, a bottom hinged thereto rearward of the center of gravity when empty and forward of the center of gravity when loaded, substantially as described.

7. An excavator shovel having a body portion and a bottom hinged thereto forward of the center of gravity and drag line mechanism for controlling said bottom, substantially as shown.

8. The combination of a shovel having a body portion, a rigidly fastened bail to said body portion, sheaves and housings fastened to said body, a bar fastened across said body, a bottom having a cutting edge integral therewith said bottom being hinged to said body, lugs fastened near one end of said bottom, a drag line having a double lead at one end and a single lead at the other end, the double lead of said drag line fastened to the lugs on said bottom brought into engagement with said sheaves, and its single end extending forward of the front end of said shovel, substantially as shown and described.

In testimony whereof I affix my signa in presence of two witnesses.

HENRY G. BUTLER.

Witnesses:
EVANGELINE O. GIBBONS,
A. B. CORNELIUS.